(12) United States Patent
Touloumtzis

(10) Patent No.: US 9,368,021 B2
(45) Date of Patent: Jun. 14, 2016

(54) VARIABLE NOTIFICATION ALERTS

(71) Applicant: Amazon Technologies, Inc., Reno, NV (US)

(72) Inventor: Michael P. Touloumtzis, Brookline, MA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/475,299

(22) Filed: Sep. 2, 2014

(65) Prior Publication Data

US 2014/0368333 A1 Dec. 18, 2014

Related U.S. Application Data

(63) Continuation of application No. 13/622,810, filed on Sep. 19, 2012, now Pat. No. 8,823,507.

(51) Int. Cl.
*G08B 23/00* (2006.01)
*G08B 21/00* (2006.01)
(Continued)

(52) U.S. Cl.
CPC ...... *G08B 23/00* (2013.01); *G08B 1/08* (2013.01); *H04L 12/1895* (2013.01); *H04L 67/24* (2013.01); *H04L 51/10* (2013.01); *H04L 51/18* (2013.01); *H04M 1/72569* (2013.01); *H04M 2203/2072* (2013.01)

(58) Field of Classification Search
CPC .......... G08B 1/08; G08B 23/00; H04L 67/24; H04L 51/14; H04L 51/20; H04L 67/306; H04L 12/1827; H04W 4/02; H04W 4/028; G06F 3/0482; G06F 1/1613; G06F 2200/1637; G06Q 10/10; G06Q 10/109; H04N 21/4788; H04N 7/15; H04N 21/42203; H04N 7/147; H04M 1/72544; H04M 1/72547
USPC .................... 340/501, 10.1, 500, 540, 539.13; 709/203, 206, 217, 219, 223, 224, 207; 455/456, 567, 575, 456.3, 414.1, 418, 455/566
See application file for complete search history.

(56) References Cited

U.S. PATENT DOCUMENTS

| 8,219,115 B1 * | 7/2012 | Nelissen | ..................... 455/456.3 |
| 8,352,546 B1 * | 1/2013 | Dollard | ................... H04L 67/24 709/203 |

(Continued)

OTHER PUBLICATIONS

"Non-Final Office Action dated Dec. 3, 2013," U.S. Appl. No. 13/622,810, 31 pages.
(Continued)

*Primary Examiner* — Mirza Alam
(74) *Attorney, Agent, or Firm* — Polsinelli LLP

(57) ABSTRACT

Approaches in accordance with various embodiments attempt to provide a user with less disruptive event notifications by being aware of a user's context. Before a notification is sent to multiple computing devices associated with the notifying account, contextual information for each device is determined. The contextual information can be determined by querying each device for information. The information can include how close each device is relative to other devices associated with the same user, if at least one of the devices is moving, whether the user's attention is focused on a particular device, whether the user is engaging multiple devices simultaneously, and the like. Once contextual information associated with each device is determined, an appropriate type of alert associated with the notification is determined for each device. Accordingly, upon determining the appropriate alert for the most probable context of each device, the notification is sent to each computing device with the determined appropriate type of alert.

17 Claims, 6 Drawing Sheets

(51) Int. Cl.
  *G08B 5/22* (2006.01)
  *G08B 1/08* (2006.01)
  *H04L 29/08* (2006.01)
  *H04L 12/18* (2006.01)
  *H04L 12/58* (2006.01)
  *H04M 1/725* (2006.01)

(56) References Cited

U.S. PATENT DOCUMENTS

| 8,823,507 | B1 | 9/2014 | Touloumtzis | |
| 2002/0119788 | A1* | 8/2002 | Parupudi | H04M 1/72563 455/456.1 |
| 2007/0139366 | A1* | 6/2007 | Dunko | G06F 1/1613 345/156 |
| 2007/0214228 | A1* | 9/2007 | Horvitz | G06Q 10/107 709/207 |
| 2009/0233629 | A1* | 9/2009 | Jayanthi | 455/457 |
| 2010/0245536 | A1* | 9/2010 | Huitema | H04N 7/147 348/14.08 |
| 2011/0148632 | A1* | 6/2011 | Chin | 340/540 |
| 2011/0231216 | A1* | 9/2011 | Fyke et al. | 705/7.12 |
| 2012/0011242 | A1* | 1/2012 | Suchter et al. | 709/224 |

OTHER PUBLICATIONS

"Notice of Allowance dated May 14, 2014," U.S. Appl. No. 13/622,810, 16 pages.

* cited by examiner

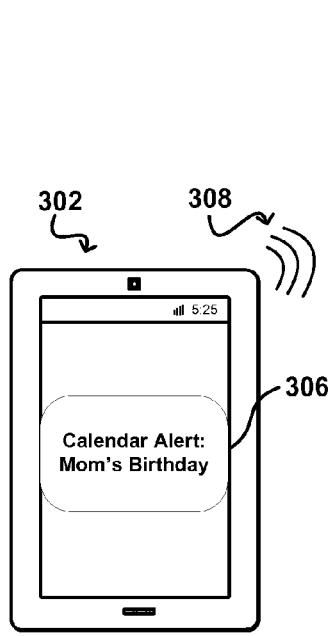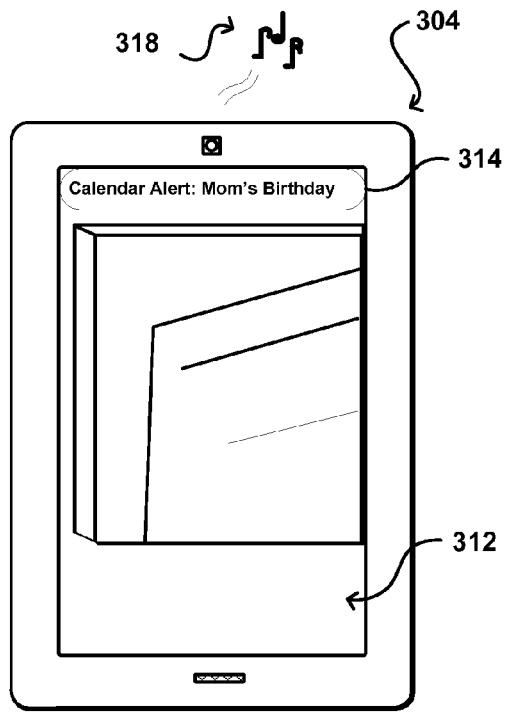
FIG. 3(a)      FIG. 3(b)
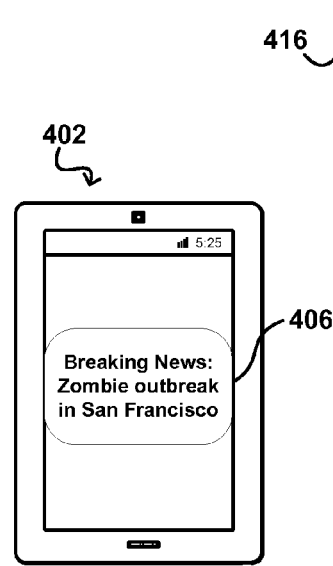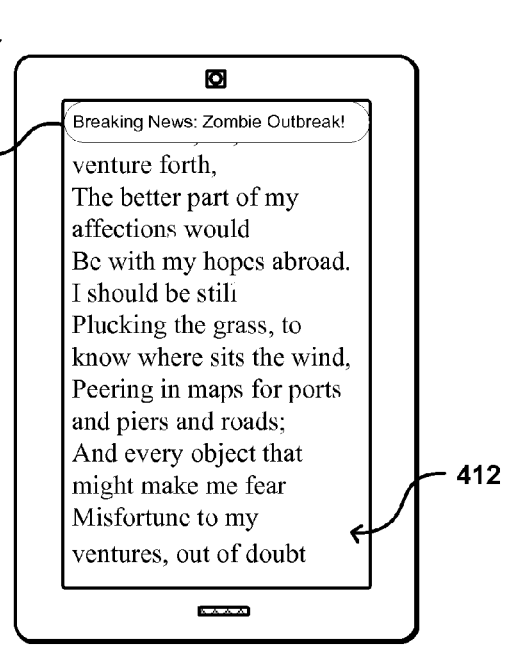
FIG. 4(a)      FIG. 4(b)

VARIABLE NOTIFICATION ALERTS

CROSS-REFERENCES TO RELATED APPLICATIONS

This application is a continuation of allowed U.S. application Ser. No. 13/622,810, entitled "Variable Notification Alerts," filed Sep. 19, 2012; of which the full disclosure of this application is incorporated herein by reference for all purposes.

BACKGROUND

Users are increasingly relying upon various electronic and computing devices to store, track, receive, and update various types of information and handle various types of tasks. For example, many users rely upon computing devices to maintain and organize calendars and schedules and provide them with reminders for events and notifications of incoming communications, news, and other such information. These reminders and notifications typically come in the form of an alert, such as an audible beep, tone, or jingle, and a visual indicator, such as a flashing light or a banner with text displayed on a display screen. Since users are increasingly utilizing multiple computing devices where each device is often tethered to the same calendar, email, messaging, social media, and news accounts, users are often bombarded with the same reminders and notifications simultaneously on all devices, resulting in multiple redundant audible and visual alerts. As technology advances and as people are increasingly using more than one computing device, it can be advantageous to adapt the ways in which these notification alerts are presented to users.

BRIEF DESCRIPTION OF THE DRAWINGS

Various embodiments in accordance with the present disclosure will be described with reference to the drawings, in which:

FIGS. 3(a) and 3(b) illustrate another example notification alert that can be provided to two or more computing devices in accordance with at least one embodiment;

FIGS. 4(a) and 4(b) illustrate another example notification alert that can be provided to two or more computing devices in accordance with at least one embodiment;

DETAILED DESCRIPTION

Figure 1:
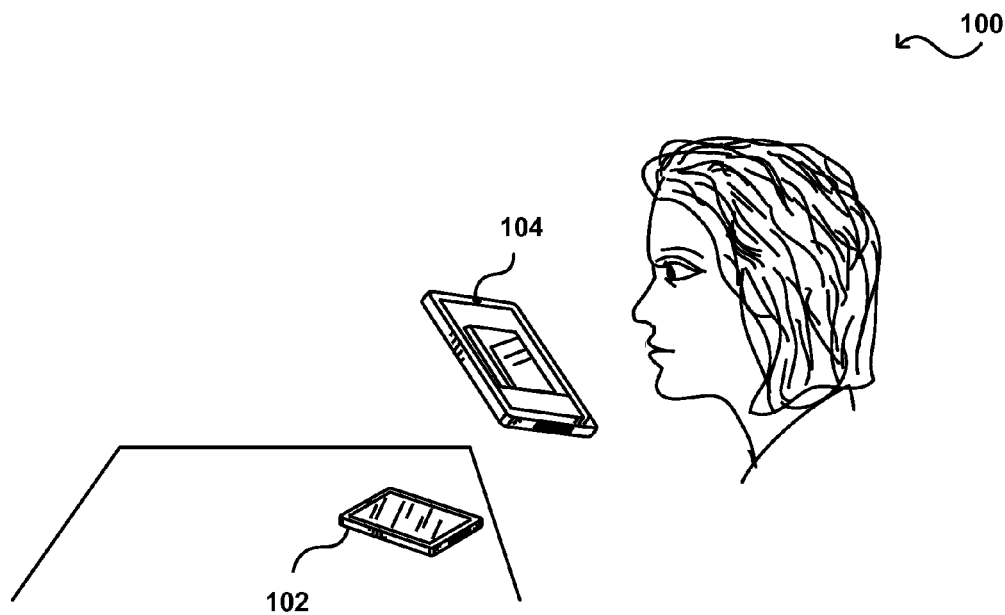
FIG. 1 illustrates an example situation where a user is in close proximity to two computing devices in accordance with at least one embodiment.

Systems and methods in accordance with various embodiments of the present disclosure may overcome one or more of the aforementioned and other deficiencies experienced in conventional approaches to providing notifications using one or more electronic devices. In particular, various approaches can provide context-aware or context-appropriate event notification alerts to two or more computing devices associated with a user. These event notifications can be associated with the same event, but can take different forms for different devices based at least in part upon the context. For example, a user might be interacting with one of the devices, and thus might receive a first type of notification on that device, while other devices with which the user is not interacting might receive a second type of notification. Various types of information can be used to determine the appropriate type of notification to provide for each device, as may include, for example, global positioning system (GPS) information, head tracking information, orientation information from a gyroscope, electronic compass, accelerometer, and the like.

Notification alerts are often displayed to users on a display element of a computing device to notify a user of events, such as emails, social media messages or updates, breaking news, software updates, calendar reminders and the like. The notification alerts often include a visual identifier, such as a banner, a popup window, an application annotation, and the like, that usually includes textual information describing the event. Additionally, an audible sound can be generated, such as an audible tone, a ringtone, or computer-generated speech to catch a user's attention. These notification alerts are often automatically pushed to a user's device and, since multiple devices are now being tethered or linked to the same email, social media, news, and other accounts, for example, users are often bombarded with the same notification alerts simultaneously across multiple devices. This is often disruptive and bothersome if the devices are all in the same room or otherwise close to the user. For example, a user working on a laptop or desktop computer with a smartphone and tablet computer in close proximity would be subject to multiple beeps, vibrations, and alerts for each device upon receiving an email. This issue is further exacerbated by the fact that these devices often include many applications that come with default alert settings that a user might not be aware of until they finally go off. In order to circumvent constant bombardment, users often turn off all alerts. However, there are instances where many users would like to be notified about a particular event and the challenge is to ensure that the user receives such notifications in a least intrusive and distracting manner.

Approaches in accordance with various embodiments attempt to provide a user having multiple computing devices with less intrusive and distracting event notifications by being aware of each device's context, as may be determined with respect to the user. Before a notification is sent to each computing device, contextual information for each device is determined. The contextual information can be determined by querying each device for information. The information can include how close each device is relative to other devices associated with the user, if at least one of the devices is moving, whether the user's attention is focused on a particular device, whether the user is engaging multiple devices simultaneously, and the like. Once contextual information associated with each device is determined, an appropriate type of alert associated with the notification is determined for each device. Accordingly, upon determining the appropriate alert for a most probable context of each device, the notification is sent to each computing device with the determined appropriate type of alert.

Various other functions and advantages are described and suggested below as may be provided in accordance with the various embodiments.

FIG. 1 illustrates an example situation wherein a user 100 is engaging in an activity on a tablet computer 104 with a smartphone 102 in close proximity, in accordance with at least one embodiment. Although a smart phone and a tablet computer are shown, it should be understood that various other types of electronic or computing devices that are capable of determining and processing input can be used in accordance with various embodiments discussed herein. These devices can include, for example, notebook computers, desktop computers, personal data assistants, electronic book readers, video gaming consoles or controllers, televisions or smart televisions, and portable media players, among others. As mentioned above, users often have multiple devices linked to the same accounts and notifications are typically pushed out to each device. In this example, a system sending a notification or alert to the user 100 sends the notification to the smartphone 102, the table computer 104, and any other devices the user has associated with the account providing the notification. Thus, when a notification is sent, in this example, the user receives the same notification including the same audible alert, vibration, and screen interruption on each of device.

Figures 2A, 2B:
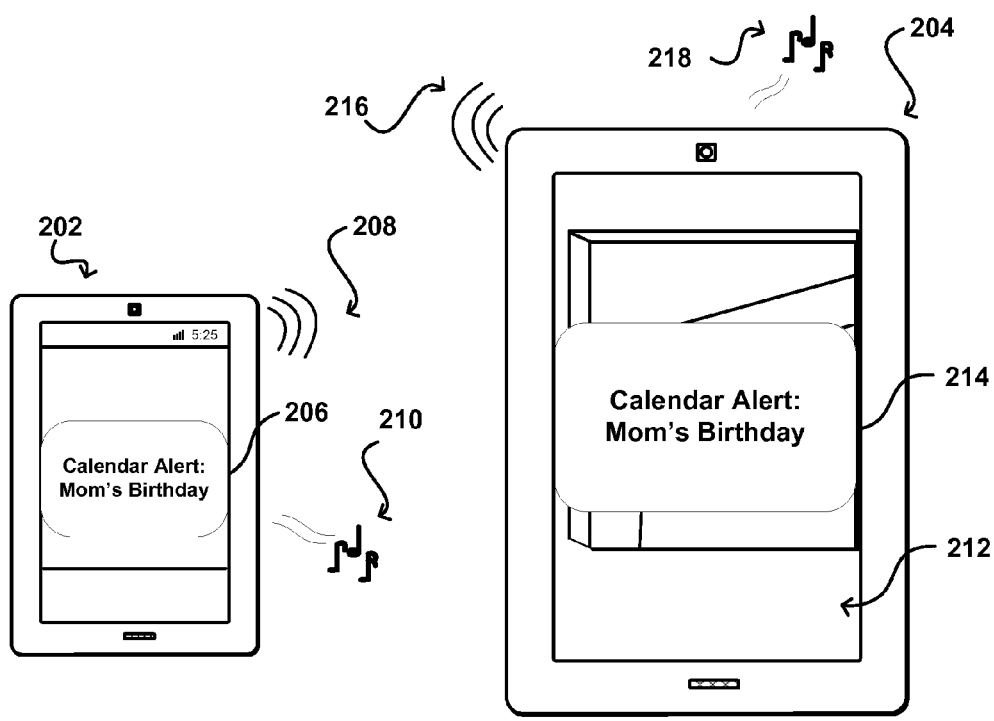
FIGS. 2(a) and 2(b) illustrate an example notification alert that can be provided to two or more computing devices in accordance with at least one embodiment.

FIGS. 2(a) and 2(b) illustrate an example notification sent to a user on two different computing devices, in accordance with various embodiments. In this example, FIG. 2(a) shows a smartphone 202 and FIG. 2(b) shows a tablet computer 204 both simultaneously receiving notification alerts 206 and 214, respectively, for the same event. In this example, the user is engaging in an activity on the tablet computer 204 with the smartphone 202 a short distance away, which is not being engaged or is in a sleep mode. In various embodiments, a user engaging, or interacting with, a computing device may include a computing device in an unlocked state, detection of at least one input to an application running thereon within at least a determined period of time, detection of motion from at least one motion sensor within at least a determined period of time, visual confirmation of a user using at least one image capturing element and image recognition algorithm, and the like.

In this example, when the smartphone 202 receives the notification 206, the smartphone 202 vibrates 208, makes an audible tone 210, and displays a notification banner 206 as the user's activity is simultaneously interrupted on the tablet 204 with a notification banner 214 displayed on the display screen 212, the tablet 204 vibrates 216, and also makes an audible tone 218. The notification, in this example, is a calendar alert 206 and 214 respectively. Thus, the user is bombarded with multiple noises, vibrations, and potentially multiple screen interruptions, which typically require a user to make a selection, or provide an input, to remove. Receiving simultaneous event notifications is often intrusive, disruptive, and/or bothersome to users. Thus, it is desirable to provide users with notifications that are less disruptive or bothersome.

Instead of bombarding users with multiple noises, vibrations, and potentially multiple screen interruptions, it would be optimal to take into account a user's context to provide notifications that are less disruptive while still being effective. FIGS. 3(a) and 3(b) illustrate the same example notification sent to a user on two different computing devices as described above, in accordance with various embodiments. In this example, however, the notifications are presented to a user in a less disruptive manner by taking the user's context into account. In this example, FIG. 3(a) shows a smartphone 302 and FIG. 3(b) shows a tablet computer 304 that have both simultaneously received a notification 306 and 314 respectively for the same event. Similar to the above example, the user is engaging in an activity on the tablet computer 304 with the smartphone 302 a short distance away, which is not being engaged or is in a sleep mode. In this example, however, a query is sent to each device to determine a level of user interaction to tailor the type of alert based on the same. Thus, in this example, the smartphone 302 receives a discrete or passive notification 306 based on the lack of user interaction or engagement. In this example, the passive notification 306 includes a vibration 308 and a default notification banner 306. The tablet computer 304, in this example, however, receives an active notification which includes an audible noise 318, a smaller, more discrete notification banner 314, since the user is already looking at the device, and does not vibrate. In this example, the active notification is intended to at least catch the user's attention and even interrupt the user. The passive notification, however, is not designed with the same intent. In this example, since both devices are both close to the user, the user likely only needs to be notified by one of them to understand that a notification has been received. As mentioned above, two or more notifications interrupting the user can be potentially annoying and disruptive to many users. Therefore, in this example, the passive notification is meant to be discrete or quiet by displaying a notification banner without a sound, in one example. In another example, the passive notification does not necessarily even have to cause a change in the device status, such as cause the device screen to "wake up." Therefore, in this example, since the smartphone 302 is in close proximity to the tablet computer 304, for which user engagement has been verified, the smartphone 302 remains silent since an additional sound in close proximity to the user would be redundant and potentially annoying or distracting. Alternatively, each respective device could determine a respective proper notification to provide when a notification is received based on the user's context and other situational, circumstantial, or environmental conditions instead of a server querying each device for the same. Further, in at least some embodiments a determination can be made as to whether the user acknowledged the notification. If the user did acknowledge receipt of the notification or engaged the respective device in a manner indicative of receiving the notification, no further action is likely necessary. However, if no indication of acknowledgement is detected within a predetermined amount of time, a notification including noise and vibration can be sent to both the smartphone 302 and tablet computer 304 to get the user's attention. Other examples, or combinations of alerts, are also possible.

FIGS. 4(a) and 4(b) illustrate another example notification sent to a user on two different computing devices as described above, in accordance with various embodiments. In this example, FIG. 4(a) again shows a smartphone 402 and FIG. 4(b) shows a tablet computer 404 that have both simultaneously received a notification 406 and 414 respectively for the same event. In this example, the user is reading on the tablet computer 404 with the smartphone 402 a short distance away, which again is not being engaged or is in a sleep mode. As mentioned above, a query could be sent to each device to determine a level of user interaction to tailor the type of alert based on the same or the device could determine the proper notification to provide. Thus, when the notification is pushed to both devices, the user is provided with a passive, more discrete notification on smartphone 402, which, in this example, only displays a notification banner 406. The smartphone 402, thus, does not vibrate or make an audible sound or noise. The tablet computer 404, however, receives an active notification, which includes displaying a smaller, notification banner 414, since the user is reading, and vibrates 416. In this example, since the smartphone 402 is in close proximity to the tablet computer 404 which the user is using to read, the smartphone 402 remains silent. In this example, neither device makes an audible noise because each device, or a system in communication therewith, is aware of each device's distances relative to each other, and may have additionally determined that the user is already looking at the tablet computer by, for example, utilizing various gaze detection or facial recognition techniques. Further, each device, or a system in communication therewith, in this example, could determine a level of ambient noise in the environment around the user. If, as suggested in this example, the user is reading in a quiet room, the respective device, or system in communication therewith, may determine providing a noise or sound with a notification would be too disruptive under the circumstances and that the probability that the user will see the notification is sufficiently high enough given fact the user is already looking at the device. Other examples, or combinations of alerts, are also possible.

Approaches in accordance with various embodiments attempt to provide a user with less disruptive notifications by being aware of a user's context. In order to provide users with notifications in the least intrusive and distracting manner, it would be advantageous for a notification system to be situationally aware of various circumstances of the user, or conditions to which the user is subject to, at a given time. For example, in order to provide a user with an appropriate notification for various circumstances or conditions, it would be advantageous to know how close each device is relative to each other, if at least one of the devices is moving, whether the user's attention is focused on a particular device, or whether the user is engaging multiple devices simultaneously.

Various approaches can be used to determine a user's context. In one embodiment, a system sending the notifications can ping or query each computing device for data associated with identifying a user in the device's field of view before forwarding the notification to all devices. In this embodiment, a computing device can be instructed to attempt to locate a user for determining whether the user is utilizing, focusing on, or engaging the device. For example, a computing device can captures image information (e.g., still images or video) of a user using at least one image capturing element. The image information is analyzed to determine the direction of the user's gaze, which can be determined using the positions of the user's eyes, pupils, head, or other such features. The computing device can include additional image capture elements as well, as may include at least one other camera, a charge-coupled device (CCD), a motion detection sensor, or an infrared sensor, among others. The at least one image capturing element enables the user to be located in a relative position with respect to the device. In various embodiments, the device can use information such as the resolution and field of view of the camera, as well as the position of the user's head or eyes in the captured images, to determine the focus of the user's attention. Thus, a notification can be sent to the single device that recognizes or identifies a user in the device's field of view. Alternatively, the system may send one type of notification alert to the device with the user's attention and another type of notification alert to the other device(s). For example, the notification sent to the device that recognized the user could include a vibration and a small banner, while the rest of the devices only receive a banner as described with respect to FIGS. 4(*a*) and 4(*b*).

In one embodiment, a system sending the notifications can ping or query each computing device for each device's current geographic location or global positioning system (GPS) data upon identifying a notification to be forwarded to a user with two or more computing devices associated therewith. For example, an audible alert may only be sent to one computing device if each device is within a relatively short distance of the other devices. Conversely, the same notification, including an audible alert, could be sent to each device if each device is sufficiently far away from the other devices. In another example, one device might be moving while two other devices associated with the same account are stationary. In this example, a default notification, including an audible sound, could be sent to the moving device while only a banner is sent to the two stationary devices. The banner can be sent to the two stationary devices, in the event the user forgot the notification after viewing it on the moving device. While examples of various embodiments in the present disclosure, for the purpose of illustration, use examples of GPS data from GPS-enabled devices, locations may be recorded using other devices and/or techniques in addition to or as an alternative to recording GPS data from a GPS-enabled device. For example, cellular tower triangulation, radio frequency identification (RFID) locating techniques, geo-location techniques using Internet protocol (IP) addresses, geolocation techniques using wireless fidelity (Wi-Fi) communication devices, and generally any technique that can be used to identify locations may be used and appropriate data associated with the technique or derived from data associated with the technique may be recorded.

Another approach that can be used to determine user engagement with a computing device, in accordance with various embodiments, can include a gyroscopic sensor to detect 3-axis angular acceleration and an accelerometer to detect the device's acceleration, shake, vibration shock, or fall. Similar to the above example, a default notification can be sent to a computing device that registers changes in movement from gyroscope or accelerometer and only send a notification banner to devices registering no changes, since such movements are indicative of a user holding or walking with a device.

Various other approaches, sensors, and methods can be used to determine user engagement with one or more computing devices, in accordance with various embodiments. For example, each computing device can be queried for information about what applications are currently running or open, whether the computing device is asleep or locked, if a touch sensor on a touch screen is or has recently received touch inputs, and the like techniques can also be used as a factor to determine what notifications are sent to a particular device. In one example, a microphone from a device could register a high or loud noise environment and send the associated computing device a loud audible alert with the notification. Alternatively, upon determining a low noise or silent environment, a discrete audible alert or vibration could be provided with the notification. These techniques and queues in conjunction with the facial recognition, gaze determination, location determination, orientation/motion and light sensors, and the like can be used together to determine which device a user is most likely engaging, or most likely near the user and what type of notification alert is most appropriate for a given combination thereof. Accordingly, for a given set of conditions or circumstances, a type of notification alert to provide with a notification can be determined by assigning each condition a weighted value. The weighted values can then be added together to form a score where each score corresponds to a particular type of notification alert. In another example, each condition or circumstance can be given a weight and an average weight could be determined for a particular set of circumstances where each average weight corresponds to a different type of notification alert. Other mathematical determinations and combinations are also possible.

Figure 5:
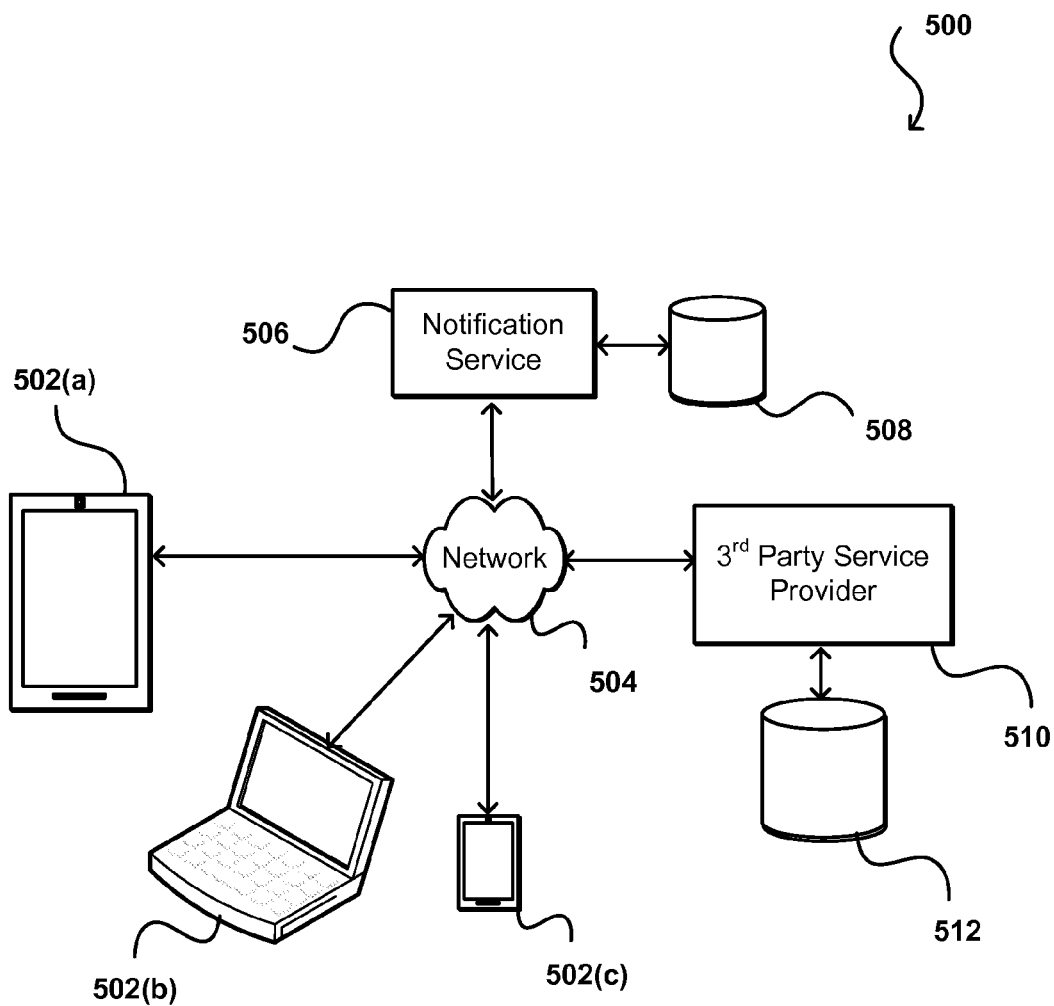
FIG. 5 illustrates a portion of an environment in which various embodiments can be implemented.

FIG. 5 illustrates an example environment 500 for delivering notifications to a user that can be utilized in accordance with various embodiments. In this example, a service provider layer or notification service 506 manages the delivery and/or stores content associated with various $3^{rd}$ party service provider 510 accounts for each user computing device (502(a), 502(b), 502(c)). The notification service 506 can be part of a large multipurpose service provider or a separate entity that fields inbound notifications and/or alerts and funnels the same to users. In this example, the notification service 506 could be part of a service layer through which many services are aggregated, data is stored, and through which the services and data flows through or originates. The notification service 506 includes at least one server or computing device able to determine an appropriate user, device, or address to send notifications thereto and to determine an optimal set of conditions to send, or forward, the same. Further, the notification service 506 can receive (or intercept) messages, alerts, or notifications from a $3^{rd}$ party service provider 510, or generate an appropriate message, alert, or notification either independently, or in response to an action from the $3^{rd}$ party service provider 510, and cause the notification to be sent across at least one network 504 (e.g., the Internet or a cellular network) to a computing device (502(a), 502(b), 502(c)) associated with the appropriate user. The at least one server can access data stored in at least one data store 508 that may include user preference data, account information, information for/about each computing device of an account, information about various $3^{rd}$ party accounts associated with the user, configuration data, or any other appropriate information. In at least one embodiment, a user registers each device, such as a tablet computer 502(a), laptop computer 502(b), or smartphone 502(c), with a notification service 506. In this example, the $3^{rd}$ party service provider 510 might work with the notification service 506, or other such entity, in order to manage delivery of the various notifications. This can be provided through an electronic application marketplace, where users can download and access applications ranging from social networking to utility applications, and/or through various other services, such cloud storage services and the like. In at least one embodiment, the notification service 506 allows the $3^{rd}$ party service providers 510 to develop these applications and the notification service 506 makes the applications available to users in the electronic application store. In other examples, the $3^{rd}$ party service provider 510 may not have any interaction with the notification service 506. Various other methods of providing push and other notifications to computing devices are also possible.

Approaches in accordance with various embodiments can attempt to determine which computing devices to send (or push) each notification (or alert) by utilizing GPS, head tracking, various motion, and like situational awareness determining sensors and methods. In one embodiment, upon receiving a notification, the notification service 506 could ping or query each device (502(a), 502(b), 502(c)), before sending the notification, to determine the location of each device relative to each other. In one embodiment, a default notification is sent to each computing device (502(a), 502(b), 502(c)) when each device is beyond at least a threshold distance relative to the other devices. In this example, the default notification can include a banner across the display screen along with an audible noise (sound, buzz, alarm, alert etc.) and a vibration. Since the user cannot be in more than one location at a time, providing such a notification to all devices would likely not be redundant or intrusive from the perspective of the user.

In one embodiment, the notification service 506 attempts to determine which computing device (502(a), 502(b), 502(c)) is most likely closest to the user when at least two devices are within the threshold distance relative to each other. In this example, the notification service 506 could instruct, or query, each computing device to capture at least one image of each device's field of view in an attempt to determine engagement from the user through head tracking or gaze determination. In one embodiment, the notification is sent to the computing device that recognizes a user in the device's field of view. Alternatively, if each computing device (502(a), 502(b), 502(c)) is unable to recognize a user in any of the captured images, the notification service 306 could further query each computing device for motion sensor data. For example, if two of the devices are stationary and one device is moving, the notification service 506 could send the alert to the moving device since the moving device is more likely to be with the user than the stationary devices. Finally, upon determining the least intrusive and distracting manner, or default manner, in which to send the notification, the notification is sent or pushed the computing devices (502(a), 502(b), 502(c)).

Approaches in accordance with various embodiments can not only attempt to determine an optimal user device to send each notification, approaches discussed herein can also determine an optimal type of notification to send to each device. In one embodiment, the notification service 506 perform various checks to determine a most appropriate type of notification to send to each device when at least two devices (502(a), 502(b), 502(c)) are within a relatively small distance of each other. In one example, a relatively small distance is a distance where a user could potentially hear more than one alert if the same alert were sent to each device. There are potentially as many types of notification as there are different combinations of possible audible noises or alerts (including different volumes of the noises or alerts), vibration patterns (including no vibration), and banner types or other visual identifiers that can be displayed to notify a user. In one example, the notification service 506 may first query each device to determine the presence of a user by capturing at least one image. In one embodiment, upon determining user engagement with a particular device, the notification service 506 could send a notification to only the device the user is engaging. Alternatively, the notification service 506 could send a first type of notification to the devices the user is not engaging without a sound or vibration, for example, while making a discrete sound, vibration, or a small banner that doesn't interrupt the user's current engagement of the computing device, but is sufficient to alert the user to a notification. In one embodiment, a default notification with an audible sound and banner can be sent to a user's smartphone (since the smartphone is likely the most engaged device out of all the devices) when all devices are in relatively close proximity to each other, when none of the devices are moving, and when no user recognition or engagement is detected, such as when a user is reading a book with a laptop computer, desktop computer, and a smartphone in the same MOM.

Various combinations and permutations of different notifications and notification types in various contexts are possible. In various embodiments, a user could choose particular notification settings for one or more situations. For example, maybe the user never wants to be interrupted with a banner, but prefers to be alerted with a vibration on a smartphone while receiving audible alerts from other devices. Many other possible examples are also possible. Further, it should be appreciated that the various methods and approaches for determining various situational conditions, circumstances, or contexts are not limited to any order in which they have been presented herein. Additionally, it is not necessary to perform all of these steps or perform all of the checks described herein and, in various embodiments, it is sufficient to perform a subset thereof. In various embodiments, once a notification is viewed, the notifications can be removed across all devices, flagged with a reminder to be viewed later on the device from which it was viewed, or flagged on the other devices. Further, notifications could be dismissed to reappear later, such as a snooze feature. In some instances, the snooze feature could also be pushable to the various devices.

In one embodiment, a family is sitting in a living room that includes a smart television with Wi-Fi connectivity, a young user on a laptop computer, three smartphones (Moms, dads, and child), a tablet computer, and a desktop computer in the next room. For example, each member of the family may all be looking forward to watching a particular sporting event together and have setup notifications, or a reminder, to be provided through an account, such as an account associated with a calendar application, cable, or other network provider, to each of their devices. In this example, blindly pushing out the same notification would likely result in seven audible alerts including one from the desktop computer in the next room. A system utilizing the teachings herein would first query each device for information. The system may first determine how close each device is relative to others. For example, the system may determine that all the devices are connected through the same wifi connection and, thus conclude each device is relatively close to each other and that the system should gather more information. Next, the system may query each device for the presence of one or more users. In this example, maybe only the camera associated with the smart television and laptop recognizes users in their respective field of view. Next, the system may query for other information such as various movements of each device through various motion sensors and light sensors. Upon receiving this information, the system could prepare notifications associated with a most likely context for each device. For example, based on the data, the system may determine that it is likely that each smartphone is in a pocket of the device's respective user; that the tablet computer is sitting on the table not being used; that no user is using the desktop computer; that there are one or more users present in front of the smart television and laptop; and prepare appropriate notifications for each device in response. For example, the smartphones may each receive a notification with a banner and vibration, a banner may appear on the smart television and laptop, and no notification is sent to the tablet and desktop computer.

Figure 6:
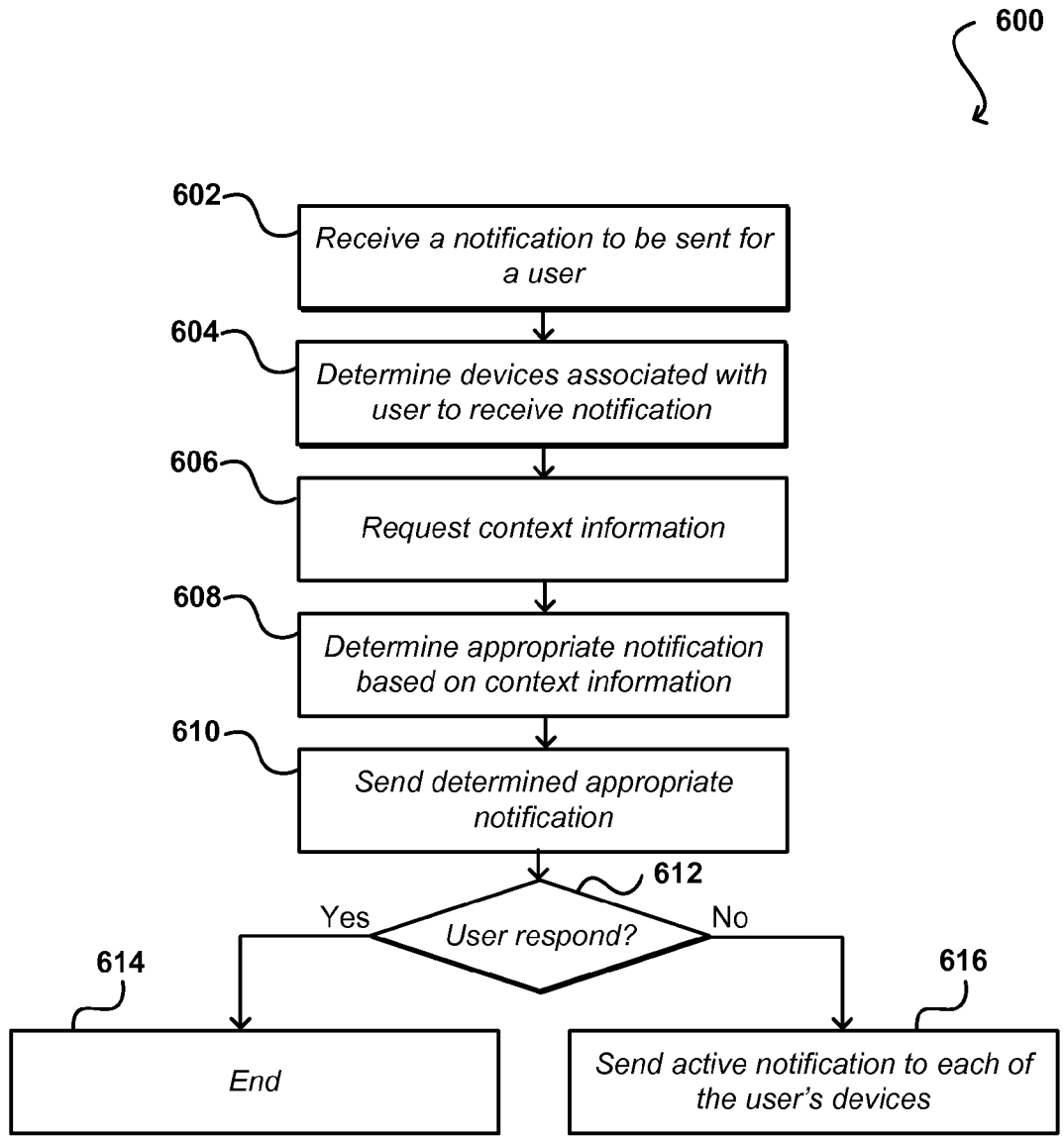
FIG. 6 illustrates an example process for providing notification alerts that can be used in accordance with at least one embodiment.

FIG. 6 illustrates an example process 600 for delivering notifications to a user that can be utilized in accordance with various embodiments. It should be understood that there can be additional, fewer, or alternative steps performed in similar or alternative orders, or in parallel, within the scope of the various embodiments unless otherwise stated. In various embodiments, a multipurpose service provider, or dedicated notification entity, can aggregate notifications or act as a main conduit through which notifications and alerts pass through. In this example, at least one server from such an entity identifies a notification for a particular account to be provided to a user 602. In this example, the entity determines, either ahead of time or upon identifying the notification, that there are two or more computing devices associated with a user account to which the identified notification is to be sent 604. In this example, the entity requests, or queries, each device of the two or more computing devices associated with the user account for context information associated with each device 606. Alternatively, the entity periodically receives this data from each computing device and instead of requesting context information, the entity determines the context of each device based in part of data received or push thereto. The context information can include GPS data representing how close each device is relative to other devices associated with the same account, if at least one of the devices is moving, head tracking/gaze determination to determine whether the user's attention is focused on a particular device, whether the user is engaging multiple devices simultaneously, and the like. Utilizing the context information, appropriate notifications are prepared or determined for a most probable context for each computing device 608. Upon determining a most probable context for each device, the prepared or determined notification is provided or sent to each device for the user to view 610. In this example, the entity determines whether the user responded to the notification or made some action indicative of acknowledgment 612. If the user did make an action indicative of acknowledgment, no further action is taken 614. If, however, the user is unresponsive or there is no response from the user upon receiving the notification, the entity can send the same active notification to each of the user's devices 616.

Figures 7A, 7B:
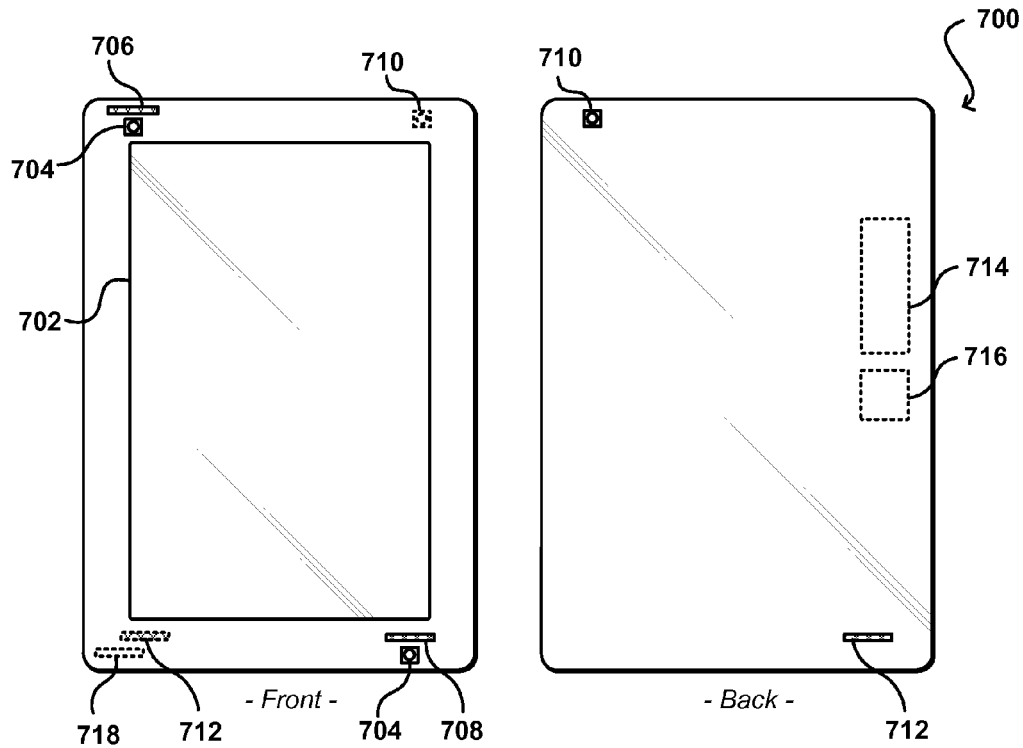
FIGS. 7(a) and 7(b) illustrate an example computing device that can be used to implement aspects of various embodiments.

FIGS. 7(a) and 7(b) illustrate front and back views, respectively, of an example electronic computing device 700 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 700 has a display screen 702 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 704 on the front of the device and at least one image capture element 710 on the back of the device. It should be understood, however, that image capture elements could also, or alternatively, be placed on the sides or corners of the device, and that there can be any appropriate number of capture elements of similar or different types. Each image capture element 704 and 710 may be, for example, a camera, a charge-coupled device (CCD), a motion detection sensor or an infrared sensor, or other image capturing technology.

As discussed, the device can use the images (e.g., still or video) captured from the imaging elements 704 and 710 to generate a three-dimensional simulation of the surrounding environment (e.g., a virtual reality of the surrounding environment for display on the display element of the device). Further, the device can utilize outputs from at least one of the image capture elements 704 and 710 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 708 on the front side, one microphone 712 on the back, and one microphone 706 on or near a top or side of the device. In some devices there may be only one microphone, while in other devices there might be at least one microphone on each side and/or corner of the device, or in other appropriate locations.

The device 700 in this example also includes one or more orientation- or position-determining elements 718 operable to provide information such as a position, direction, motion, or orientation of the device. These elements can include, for example, accelerometers, inertial sensors, electronic gyroscopes, and electronic compasses.

The example device also includes at least one communication mechanism 714, such as may include at least one wired or wireless component operable to communicate with one or more electronic devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

Figure 8:
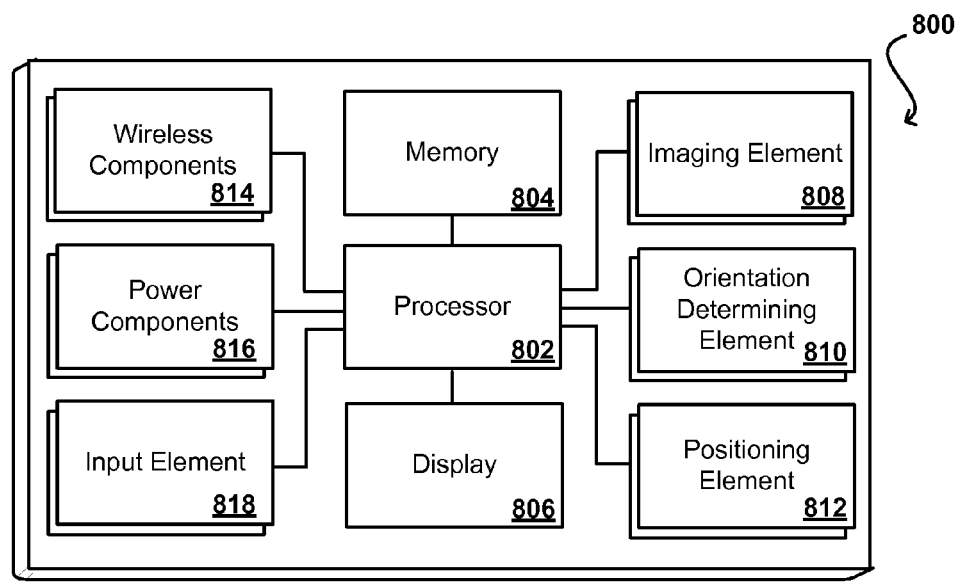
FIG. 8 illustrates example components that can be used with a device such as that illustrated in FIGS. 7(a) and 7(b)

FIG. 8 illustrates a set of basic components of an electronic computing device 800 such as the device 700 described with respect to FIG. 7. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices.

The device typically will include some type of display element 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 710 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 9:
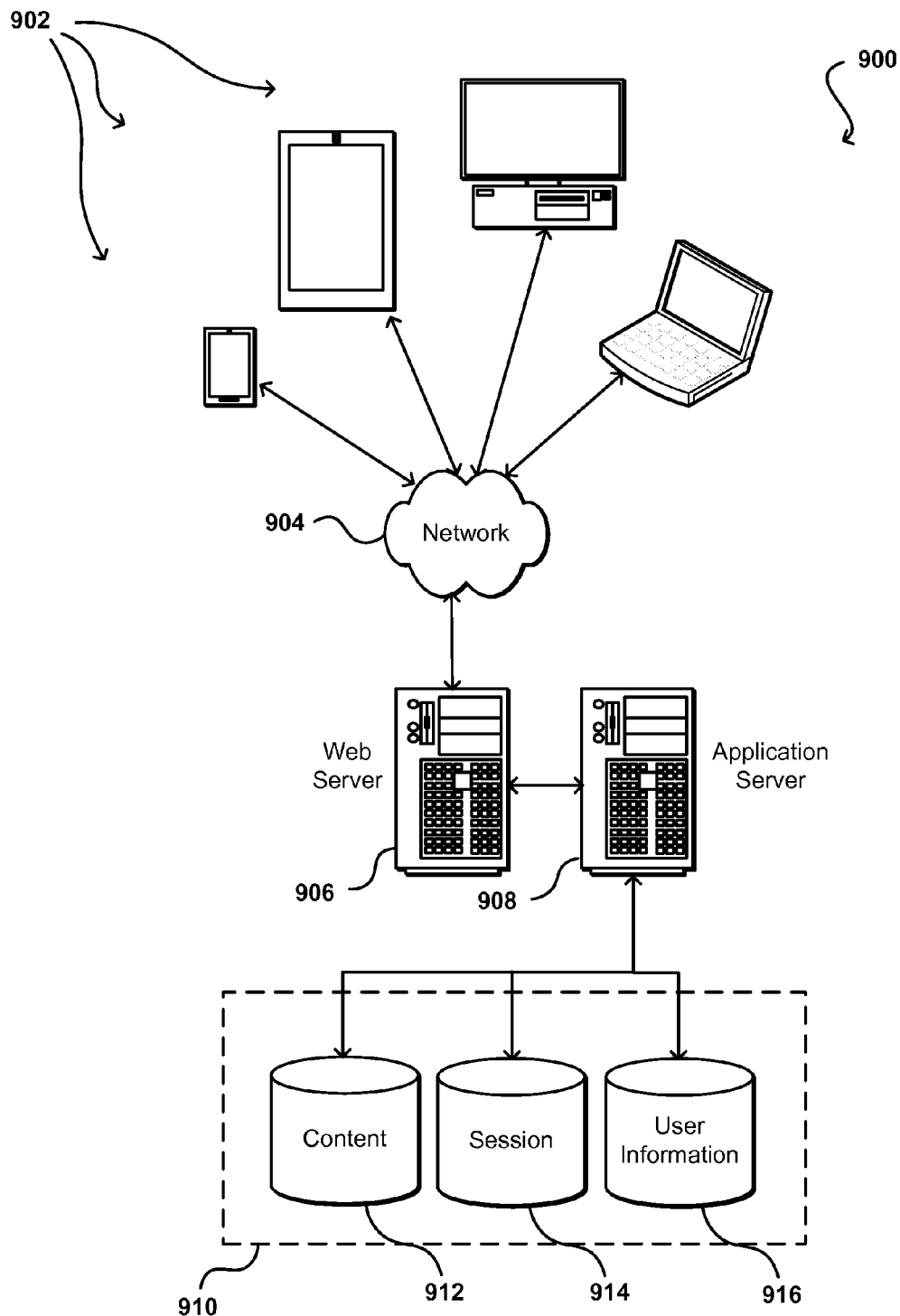
FIG. 9 illustrates another environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of providing a device notification, the method comprising:
    under control of one or more computer systems configured with executable instructions,
        receiving an alert for delivery to an account associated with a first computing device, associated with a second computing device, and associated with a third computing device;
        receiving from the first computing device first contextual information including at least one of head tracking data, facial recognition data, or gaze determination data;
        sending a first alert to the first computing device based at least in part on the first contextual information, the first alert including first data to cause a visual output and a first audio output from the first computing device;
        receiving from the second computing device second contextual information including first proximity data indicating that the second computing device is within a threshold distance relative to the first computing device; and
        sending a second alert to the second computing device based at least in part on the second contextual information, the second alert lacking second data to cause second audio output from the second computing device;
        receiving from the third computing device third contextual information including second proximity data indicating that the third computing device is beyond the threshold distance relative to the first computing device; and
        sending a third alert to the third computing device based at least in part on the third contextual information, the third alert including third data to cause third audio output from the third computing device.

2. The computer-implemented method of claim 1, wherein the first alert is an active alert, and the method further comprises:
    sending information to the first computing device to display a prompt for acknowledging receipt of the first alert.

3. The computer-implemented method of claim 1, wherein the second alert includes a passive notification.

4. The computer-implemented method of claim 1, wherein the second contextual information includes an absolute position of the second computing device received from at least one of a global positioning system (GPS), a cellular network component, a radio frequency identifier (RFID) component, or a wireless fidelity (Wi-Fi) component.

5. The computer-implemented method of claim 1, wherein sending the first alert to the first computing device is further based at least in part on the first proximity data indicating that the second computing device is within the threshold distance relative to the first computing device.

6. The computer-implemented method of claim 1, wherein sending the first alert to the first computing device is further based at least in part on the first computing device identifying movement of the first computing device.

7. A system, comprising:
    a processor; and
    a memory including instructions that, when executed by the processor, cause the system to:

receive an alert for delivery to an account associated with a first computing device, associated with a second computing device, and associated with a third computing device;

receive from the first computing device first contextual information including at least one of head tracking data, facial recognition data, or gaze determination data;

send a first alert to the first computing device based at least in part on the first contextual information, the first alert including first data to cause a visual output and a first audio output from the first computing device;

receive from the second computing device second contextual information including first proximity data indicating that the second computing device is within a threshold distance relative to the first computing device;

send a second alert to the second computing device based at least in part on the second contextual information, the second alert lacking second data to cause second audio output from the second computing device;

receive from the third computing device third contextual information including second proximity data indicating that the third computing device is beyond the threshold distance relative to the first computing device; and send a third alert to the third computing device based at least in part on the third contextual information, the third alert including third data to cause third audio output from the third computing device.

8. The system of claim 7, wherein the first alert is type an active alert, and the instructions when executed further cause the system to:
send information to the first computing device to display a prompt for acknowledging receipt of the first alert.

9. The system of claim 7, wherein the second alert includes a passive notification.

10. The system of claim 7, wherein the second contextual information includes an absolute position of the second computing device received from at least one of a GPS, a cellular network component, an RFID component, or a Wi-Fi component.

11. The system of claim 7, wherein the instructions when executed to cause the system to send the first alert to the first computing device is further based at least in part on the first proximity data indicating that the second computing device is within the threshold distance relative to the first computing device.

12. The system of claim 7, wherein the instructions when executed to cause the system to send the first alert to the first computing device is further based at least in part on the first computing device identifying movement of the first computing device.

13. A non-transitory computer-readable storage medium having a computer-readable program code embodied therein for providing a device notification, the computer-readable program code, when executed by a processor, causing the processor to:

receive an alert for delivery to an account associated with a first computing device, associated with a second computing device, and associated with a third computing device;

receive from the first computing device first contextual information including at least one of head tracking data, facial recognition data, or gaze determination data;

send a first alert to the first computing device based at least in part on the first contextual information, the first alert including first data to cause a visual output and a first audio from the first computing device;

receive from the second computing device second contextual information including first proximity data indicating that the second computing device is within a threshold distance relative to the first computing device;

send a second alert to the second computing device based at least in part on the second contextual information, the second alert lacking second data to cause second audio output from the second computing device;

receive from the third computing device third contextual information including second proximity data indicating that the third computing device is beyond the threshold distance relative to the first computing device; and send a third alert to the third computing device based at least in part on the third contextual information, the third alert including third data to cause third audio output from the third computing device.

14. The non-transitory computer-readable storage medium of claim 13, wherein the first alert is an active alert, and the computer-readable program code when executed by the processor further causes the processor to:
send information to the first computing device to display a prompt for acknowledging receipt of the first alert.

15. The non-transitory computer-readable storage medium of claim 13, wherein the second alert includes a passive notification.

16. The non-transitory computer-readable storage medium of claim 13, wherein the second contextual information includes an absolute position of the second computing device received from at least one of a GPS, a cellular network component, an RFID component, or a Wi-Fi component.

17. The non-transitory computer-readable storage medium of claim 13, wherein the computer-readable program code when executed to cause the processor to send the first alert to the first computing device is further based at least in part on the first proximity data indicating that the second computing device is within the threshold distance relative to the first computing device.

* * * * *